United States Patent
Ho et al.

(10) Patent No.: US 6,314,292 B1
(45) Date of Patent: Nov. 6, 2001

(54) METHOD AND APPARATUS FOR ENHANCED CALL SETUP

(75) Inventors: Joseph S. M. Ho, Dallas; Jim Xu, Plano, both of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/911,628

(22) Filed: Aug. 15, 1997

(51) Int. Cl.⁷ .................................................. H04Q 7/20
(52) U.S. Cl. ............................................ 455/450; 455/464
(58) Field of Search ..................................... 455/450, 455, 455/509, 513, 464

(56) References Cited

U.S. PATENT DOCUMENTS 5,404,355 * 4/1995 Raith ........................................ 455/70
5,574,771 * 11/1996 Driessen et al. ....................... 455/413

OTHER PUBLICATIONS

Woldemar F. Fuhrmann et al., "Performance Aspects of the GSM Radio Subsystem" Proceedings of the IEEE vol. 82 No. 9, pp. 1449–1465, Sep. 01, 1994.*

Stephan Bohmer, "Performance Analysis of the GSM Signalling Protocol LAPD$_m$,"Proceedings of the Vehicular, Technology Conference, Stockholm, Jun. 08–10, 1994 vol. 1 No. 44, Jun. 08, 1994, pp. 719–723.*

Johnny N. Ku, "Strategies on the Immediate Assignment Procdure within the GSM Call Setup Scenario"From Pioneers to the 21$^{st}$ Century, Denver, May 10–13, 1992 vol. 2 No. 42, May 10, 1992, pp. 786–789.*

* cited by examiner

Primary Examiner—Dwayne D. Bost
Assistant Examiner—Raymond B. Persino
(74) Attorney, Agent, or Firm—Carr & Storm, L.L.P.

(57) ABSTRACT

A method is illustrated for reducing the call setup time of high priority calls such as voice or high speed user generated data without unduly wasting RF frequency resources on non priority calls such as short message calls. This is accomplished by ascertaining the call priority at the base station controller (BSC) level in a GSM system soon after call initiation and immediately changing the channel assignment for use by the remaining signalling type messages to a different operational speed where appropriate. The concept is further extended by supplying the call priority data to a called party's BSC such that all signalling messages after initial contact can be at the operational speed appropriate to the priority of the call.

15 Claims, 5 Drawing Sheets

METHOD AND APPARATUS FOR ENHANCED CALL SETUP

FIELD OF THE INVENTION

The present invention relates in general to cellular communication systems and, in particular, to methods and systems for reducing the average time required for call setup in such systems.

BACKGROUND OF THE INVENTION

According to GSM standard operating procedures, a mobile terminal or station must first request a signaling channel from the network before the call setup can proceed. This signaling channel is used for the exchange of call setup related messages between the mobile terminal and the network. Since a large number of signaling messages must be exchanged between the mobile station and the network in order to setup a call, the speed of the signaling channel directly affects the connection setup delay.

In the prior art, to conserve wireless telephony bandwidth, the signaling channel assigned to the mobile station at the beginning of the call is a normally low speed signalling channel designated as a "SDCCH" channel. Once the call setup related signaling is complete, the network will assign a traffic channel to the mobile station. In general the traffic channel is a higher speed channel than the signaling channel which was originally assigned to that mobile station.

Depending upon the type of signaling channel used for setting up the call and the time when the traffic channel is assigned to the mobile station, there are two major call setup options presently being utilized in the industry. A first option is designated in the GSM standard as early assignment (EA) while a second GSM standard option is designated as very early assignment (VEA).

Under EA, the mobile station is initially assigned a standalone dedicated control channel (SDCCH). The SDCCH channel is a relatively slow channel which is intended for carrying signaling traffic only. As soon as the call "setup" message from the mobile station to the mobile switching center and the return "call proceeding" message are completed, the network assigns a full traffic channel, (TCH/F), to the mobile station if a voice or user generated data call has been detected by the network. This traffic channel remains idle until the user communication starts. If no voice call is detected by the network, the call is completed at the slow channel rate.

Under VEA, the mobile station is assigned a TCH/F channel at the very beginning of the call setup. This full traffic channel is initially configured or used in a mode called a signaling channel and it is used for the exchange of all call setup related signaling messages. After the setup message is received from the mobile station, the network modifies the transmission mode of the TCH/F channel to a speech channel for voice or a data channel for data if the communication is voice or user generated data respectively. This TCH/F channel stays idle until user communication starts.

It has been found that, depending upon many variables, the average call setup delay for mobile to mobile calls using EA is in the range of 7 to 15 seconds. This call setup delay is too long in the opinion of most network providers. When the VEA setup approach is used, the call setup delay, for a given network, can be typically reduced to almost half the delay that would have occurred using the EA setup approach. However, since a TCH/F channel is always assigned to the mobile station regardless of the type of service requested by the mobile station, the amount of user traffic that can be carried by the TCH/F channel is reduced, thus the call blocking probability for the network is increased and accordingly the network capacity is decreased.

SUMMARY OF THE INVENTION

The present invention reduces the long call setup time of the EA prior art approach while preventing the increase of call blocking probability of the VEA prior art approach by detecting the type or priority of a call early in the call setup protocol and reassigning signalling channels as necessary to obtain the same speed for signalling messages as is used for communication after the call setup is completed and a connection is finalized.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
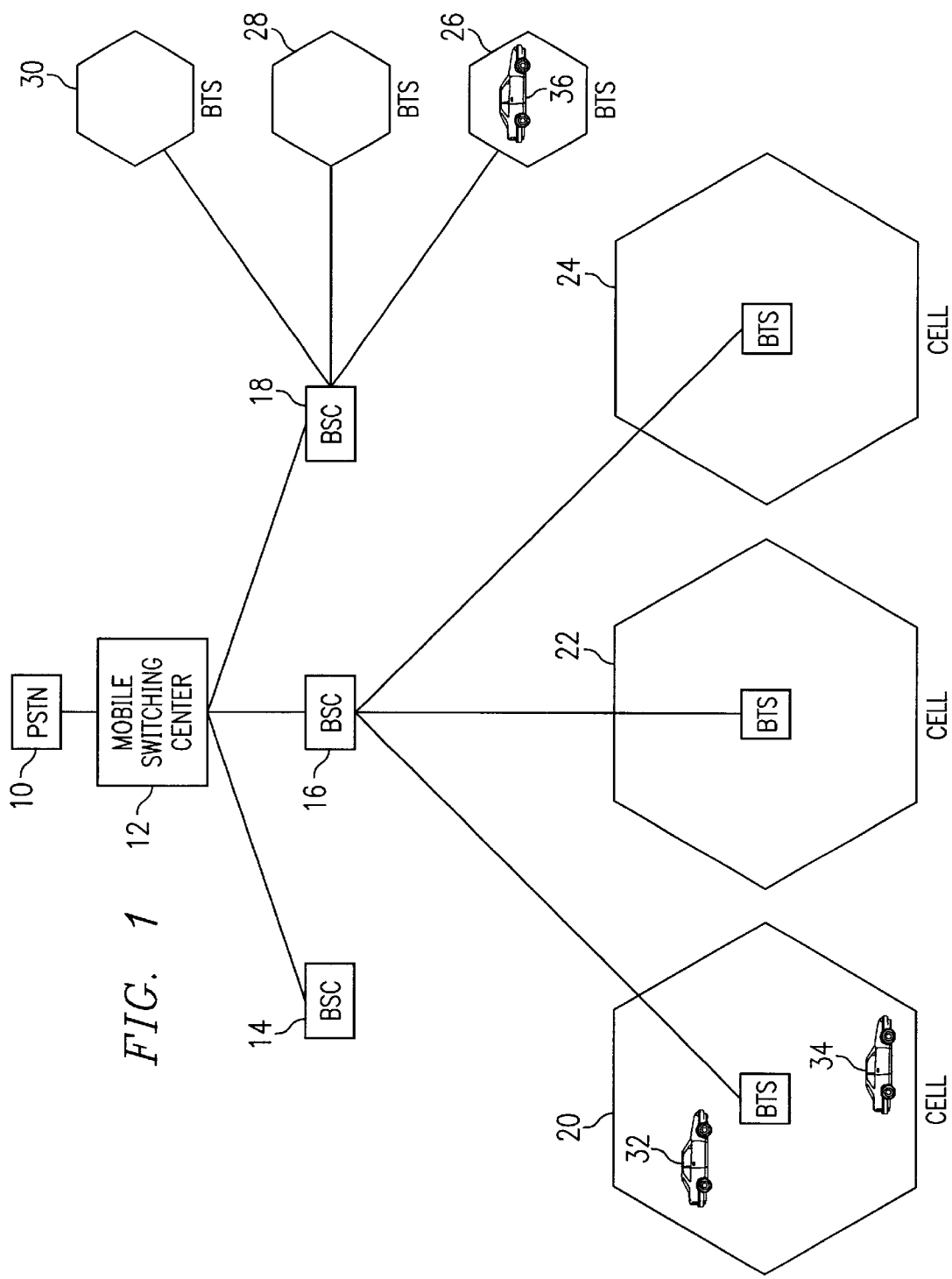
FIG. 1 is a block diagram of a cellular system constructed in accordance with GSM standards.

The principles of the present invention and their advantages are best understood by referring to the illustrated embodiment depicted in FIGS. 1–5, in which like reference numbers describe like parts.

As explained briefly previously, the present invention detects the type of call being made early in the call setup series of messages and adjusts the speed of the signalling channel to match the speed of the channel to be used for the final communication after setup is complete. This is accomplished in a GSM (Global System for Mobile communications) system by checking the service type requested by the mobile station as given in the CM_service_Req message and altering the channel assignment as appropriate, before completing the remainder of the call setup process, to the type of channel, SDCCH or TCH/F, that will be used by the mobile station for the remainder of the communication. In a GSM system the SDCCH channel is a low speed signalling channel normally used for call setup and low priority messages while the TCH/F channel is higher speed and is normally used for voice traffic.

According to one embodiment of the present invention, the network initially assigns either a slow speed channel such as a SDCCH channel or a higher speed channel such as a TCH/F channel to a mobile station requesting a channel, in accordance with the setup procedures desired by a network provider. As soon as the CM (communication management) service request message is received from a mobile station, the BSC (Base Station Controller) checks the message, unlike prior art approaches, to determine the type of service requested by the mobile station. If the initial channel assignment is determined to be inappropriate to the type of service requested, channel switching is performed at this time. The remainder of the call setup process is then completed at the speed to be used by the mobile station for the actual communication. Thus, a TCH/F (Full Traffic CHannel) is always used for the remainder of the setup messages for voice calls since the setup time of voice and user generated data calls are delay sensitive and the setup time should be a short as possible. On the other hand, a SDCCH or similar type slow signalling channel is used to complete the remainder of the setup process for other types of calls, such as short message services and location updates, which are not as delay sensitive as perceived by the mobile station user.

The approach used in this invention allows the reduction of the call setup delay by up to 50 percent while keeping the call blocking probability rate at a level similar to that provided by the initial early assignment (EA) approach where there is no change in system configuration of channel types available.

It has been determined that if the system configuration is changed such that a plurality of SDCCH or similar type slow signalling channels are combined to form one or more additional traffic channels, the call blocking probability can, in many instances of network size and configuration, be reduced. This is as compared to the blocking probability that would have occurred in the prior art early assignment approach while still reducing the call setup delay by as much as 50 percent as compared to the prior art EA approach. Thus a higher radio channel capacity is provided at each cell of the network.

FIG. 1 is a block diagram of a standard cellular system in accordance with GSM standards. A block 10 labeled PSTN represents the public switched telephone network and is shown connected to a block 12 designated as a mobile switching center and is often referred to by the acronym of MSC. The MSC 12 is shown connected to three BSC (Base Station Controller) blocks 14, 16 and 18. Although each BSC would be connected to and control a plurality of BTSs (Base Station Transceiver)s, only three BTSs are shown connected to BSC 16 and as illustrated where the cells of the BTSs are designated as 20, 22 and 24. Likewise, BSC 18 is connected to BTS cells 26, 28 and 30. The BTS cell blocks are shown in hexagonal format which is the industry standard representation of a cell within which a mobile station may reliably receive communications from that particular transceiver. Within BTS cell 20 are shown two cars 32 and 34 representing mobile stations able to use the cellular network via the BTS for cell 20. These mobile stations may leave BTS cell 20 and enter BTS cell 22 and continue communications via the BTS of cell 22 as is known to those skilled in the art. For completeness of description, a mobile station 36 is shown within BTS cell 26.

Figure 2:
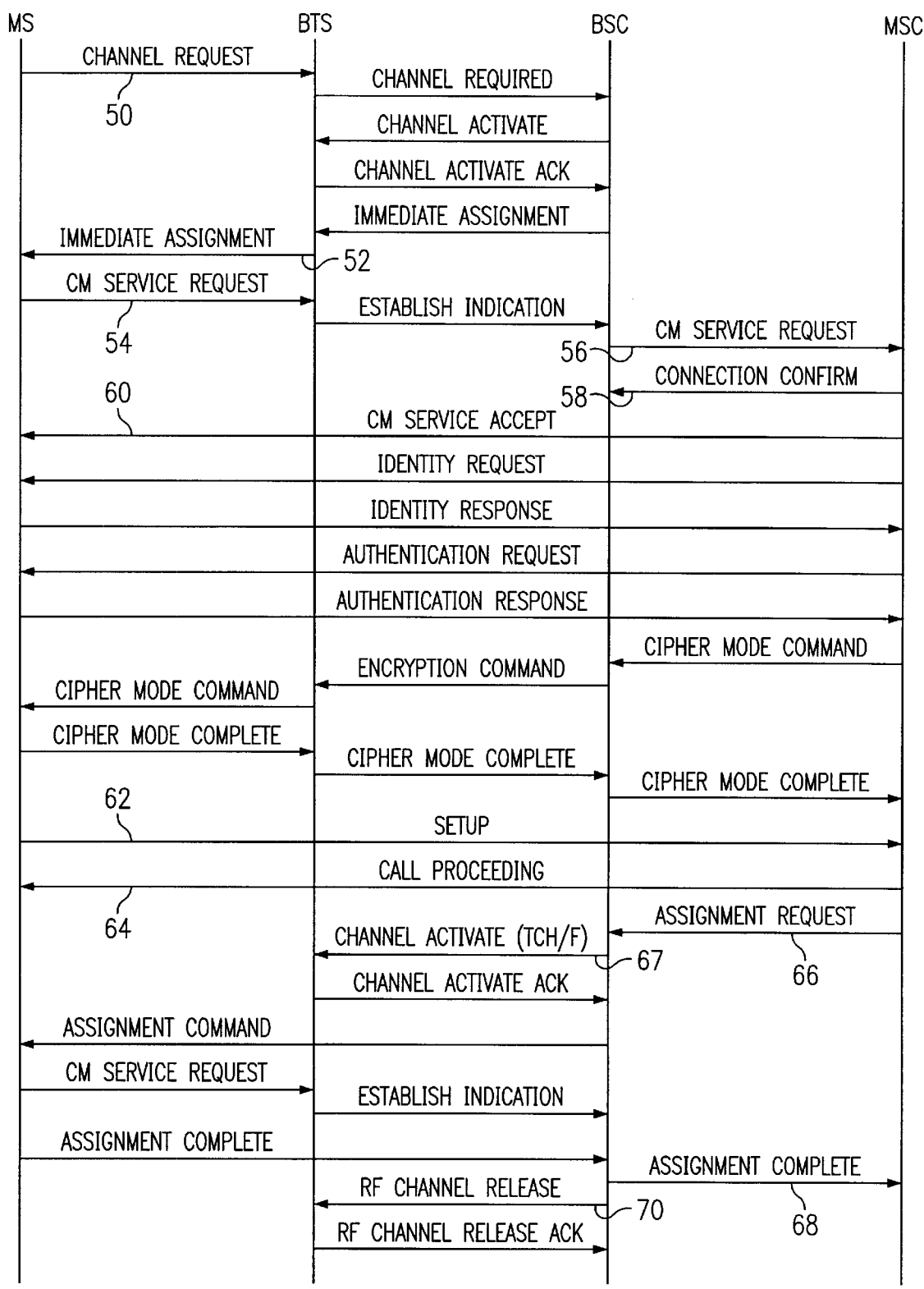
FIG. 2 is a message flow diagram of a GSM standard EA (Early Assignment) call setup option.

In FIG. 2 a series of messages are shown as taking place between the MS (Mobile Station), the BTS that defines a cell within which the MS is located, the BSC for that BTS and the MSC when a system is configured to operate in an EA (Early Assignment) mode. When the MS, such as 32 in FIG. 1 wishes to initiate a call, a channel request 50 is sent. After several messages are exchanged between the BTS 16 and the BSC 16, an immediate assignment message 52 is returned to the MS 32. The channel assigned is a SDCCH channel, a slow speed control channel defined in GSM standards for use in an EA configuration. The MS responds with a CM (Communication Management) Service Request message 54. Although message 54 includes data as to whether the request for service is voice or non-voice (i.e. short message service), the prior art GSM standard was such that the BSC 16 does not read this information. Rather the service request is merely passed on to the MSC as message 56. It should be noted that, as used in this document, the term "voice" includes relatively high speed user supplied data that might be generated from a computer or fax as opposed to low speed short message service data. The MSC confirms the connection to the BSC with message 58 and returns an acceptance message 60 to the MS 32. After identity, authentication and cipher mode messages are exchanged between MS 32 and MSC 12, a setup complete message 62 is transmitted from the MS 32 to MSC 12. After a call proceeding message 64 is transmitted, the MSC 12 issues an assignment request message to the BSC 16 to activate a TCH/F channel, a full rate traffic or voice quality channel, in those instances where the original request 54 indicated a voice quality transmission request. As known to those skilled in the art, the SDCCH channel does not have a traffic mode that needs to be altered. When the assignment of a voice channel is completed as indicated by message 68 the RF (radio frequency) channel used for the previous signalling is released for use by another MS wishing to establish communication or for other network messages such as location updates of MSs.

Figure 3:
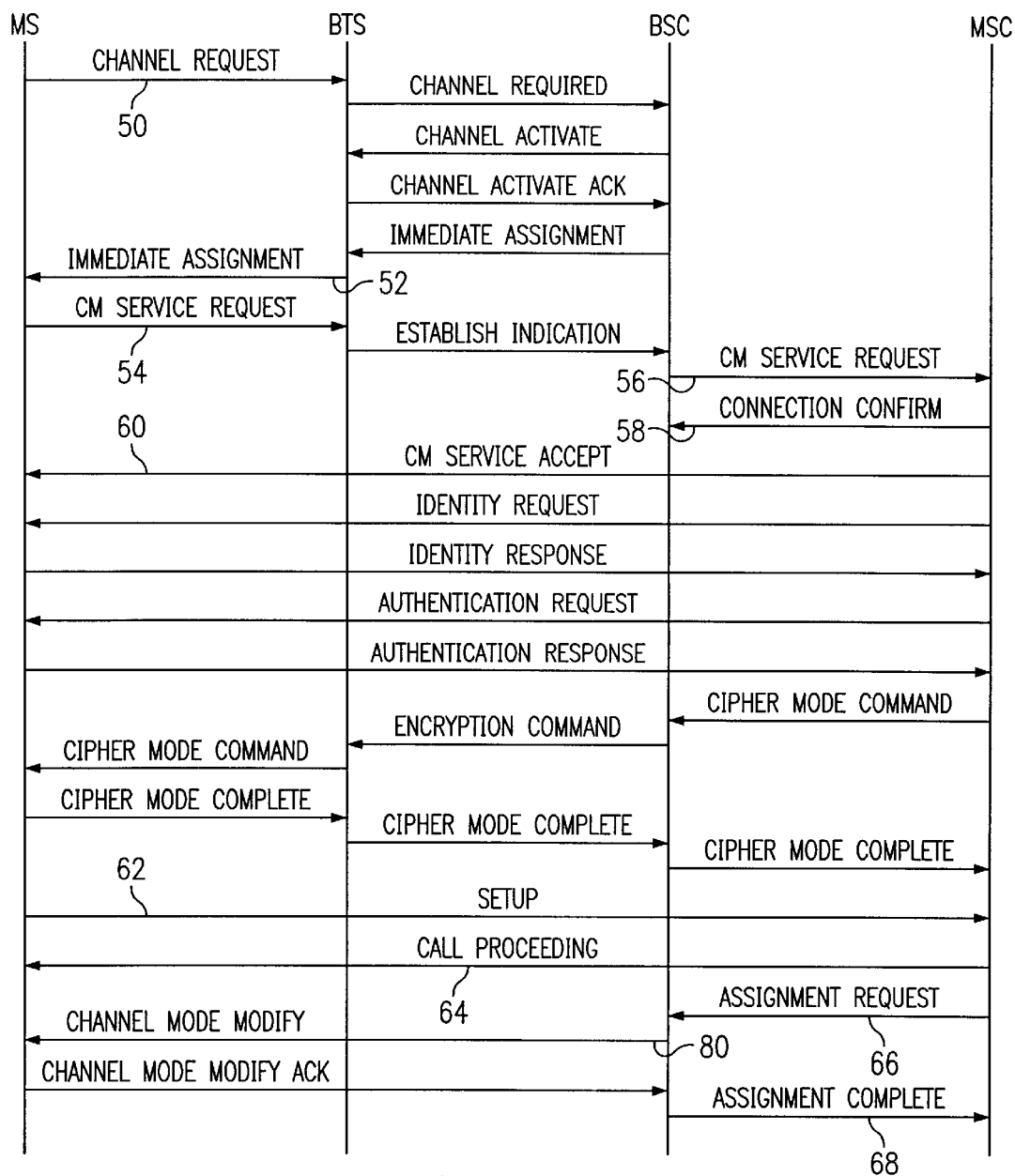
FIG. 3 is a message flow diagram of a GSM standard VEA (Very Early Assignment) call setup option.

The message diagram of FIG. 3 for the prior art GSM standard VEA option is very similar to that of FIG. 2. However, as explained previously, all the messages shown after the immediate assignment message 52 are transmitted at the voice message rate and thus there is no release of the signalling channel as occurred in connection with message 70 of FIG. 2. Further, rather than activate a voice or data channel, as occurred in connection with message 67 in FIG. 2 after the occurrence of message 66, the transmission mode of the channel is merely modified as indicated in message 80 to indicate a speech or data communication mode rather than a signalling mode. As previously indicated, for a system using the VEA option of FIG. 3, all messages, including those with a low priority, use the same speed channels. In other words, with the VEA option, the SDCCH channels are not used by the MS. The term "priority" as used herein refers to how the system responds to service requests. Voice and higher speed user generated data will be considered to have a higher priority that short message service and location update type data.

If MS 32 is calling another MS, such as 36, the call setup for MS 36 will use substantially identical messages and identical message speeds as originally used by MS 32. Thus with the EA option, all the signalling messages after initial contact, with regard to MS 36 setup, would also be at the SDCCH speed.

Figure 4:
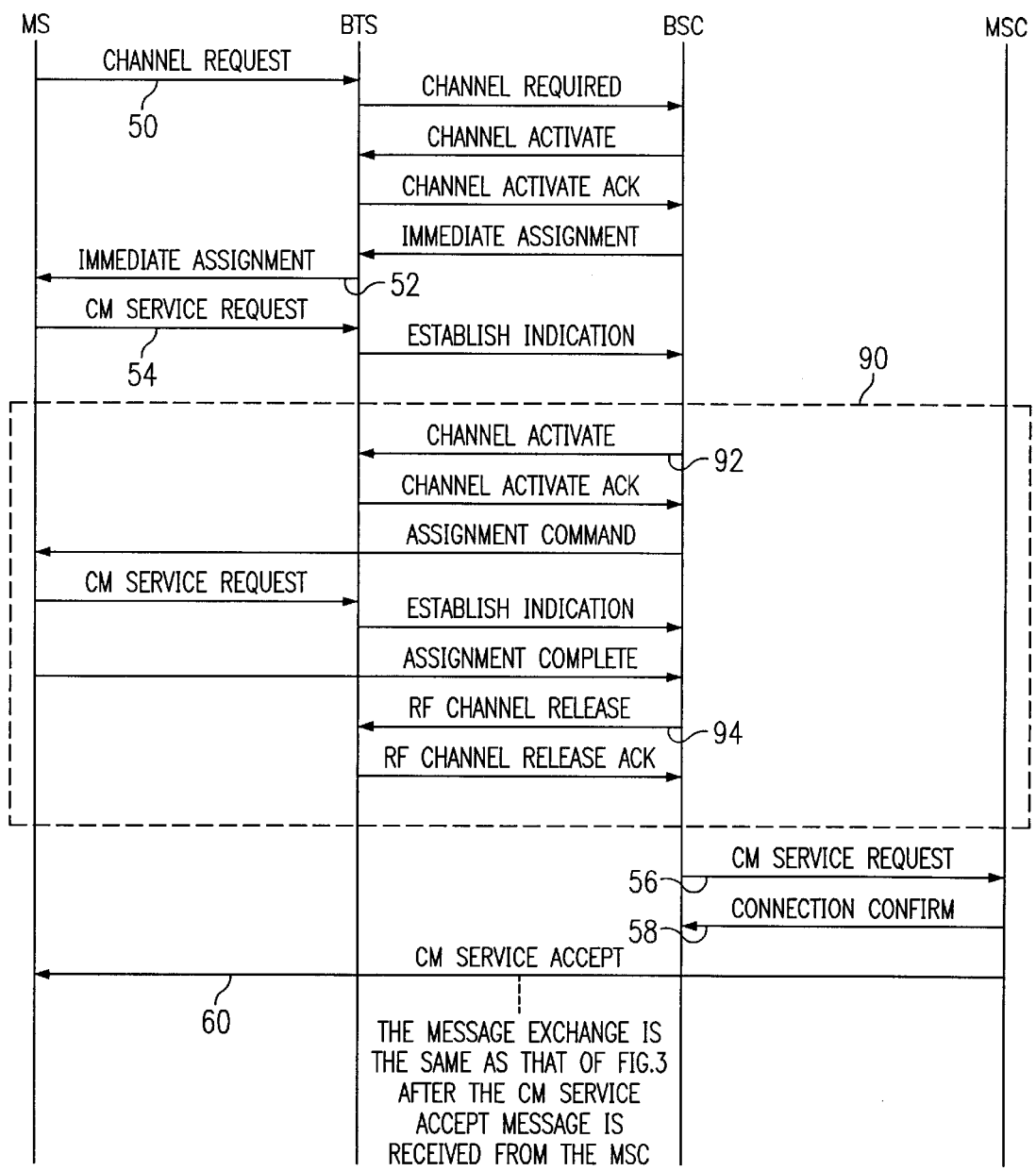
FIG. 4 is a message flow diagram of call setup in accordance with the present invention.

A comparison of the message diagram of FIG. 4 with FIG. 3 will show that the mode of operation and the messages are identical until after CM service request message 54. In the present invention the software of the BTS, the BSC and MSC is modified such that the BSC reads the data in the service request message 54. The network provider may optionally setup and use the present invention to initially assign and use either slow speed SDCCH or high speed TCH/F signalling channels and then soon thereafter switch to the speed appropriate to the type or priority of service requested.

It will first be assumed that the network provider sets up the system to initially use the SDCCH signalling channels. If the BSC ascertains that the service requested is low priority such as for "short message service", the BSC skips all the messages in dash line block 90 and continues with message 56 as would occur in the prior art VEA option configuration. However, the messages would be in the slow message format of SDCCH to conserve telephony bandwidth. Further the channel mode would not need to be modified from signalling to communication was illustrated by message 80 in FIG. 3.

On the other hand, if BSC 16 ascertains from forwarded message 54 that the service requested is for a voice priority communication, a channel activate message 92 is issued by BSC 16. This message 92 operates in a manner substantially identical to the message set initiated by MSC 12 with messages 66 and 67. After the MS is reassigned to a high speed channel, the original slow speed channel is released for further use by the release message 94 in a manner substantially identical to that occurring with message 70 in connection with the EA option of FIG. 2. Thus the service request signalling message 56 is transmitted to MSC 12 in a high speed mode as are the remainder of the signalling messages.

It will now be assumed that the network provider sets up the system to initially use the TCH/F signalling channels. If the BSC ascertains that the service requested is high priority such as for voice, the BSC skips all the messages in dash line block 90 and continues with message 56 as would occur in the prior art VEA option configuration. The channel mode would be modified from signalling to communication as illustrated by message 80 in FIG. 3 but would remain in the fast format.

On the other hand, if BSC 16 ascertains from forwarded message 54 that the service requested is for non-voice uses, a channel activate message 92 is issued by BSC 16. This message 92 operates in a manner substantially identical to the message set initiated by MSC 12 with messages 66 and 67. After the MS is reassigned to a low speed channel, the original TCH/F channel is released for further use by the release message 94 in a manner substantially identical to that occurring with message 70 in connection with the EA option of FIG. 2. Thus the service request signalling message 56 is transmitted to MSC 12 in a low speed mode as are the remainder of the signalling messages to conserve telephony bandwidth.

Figure 5:
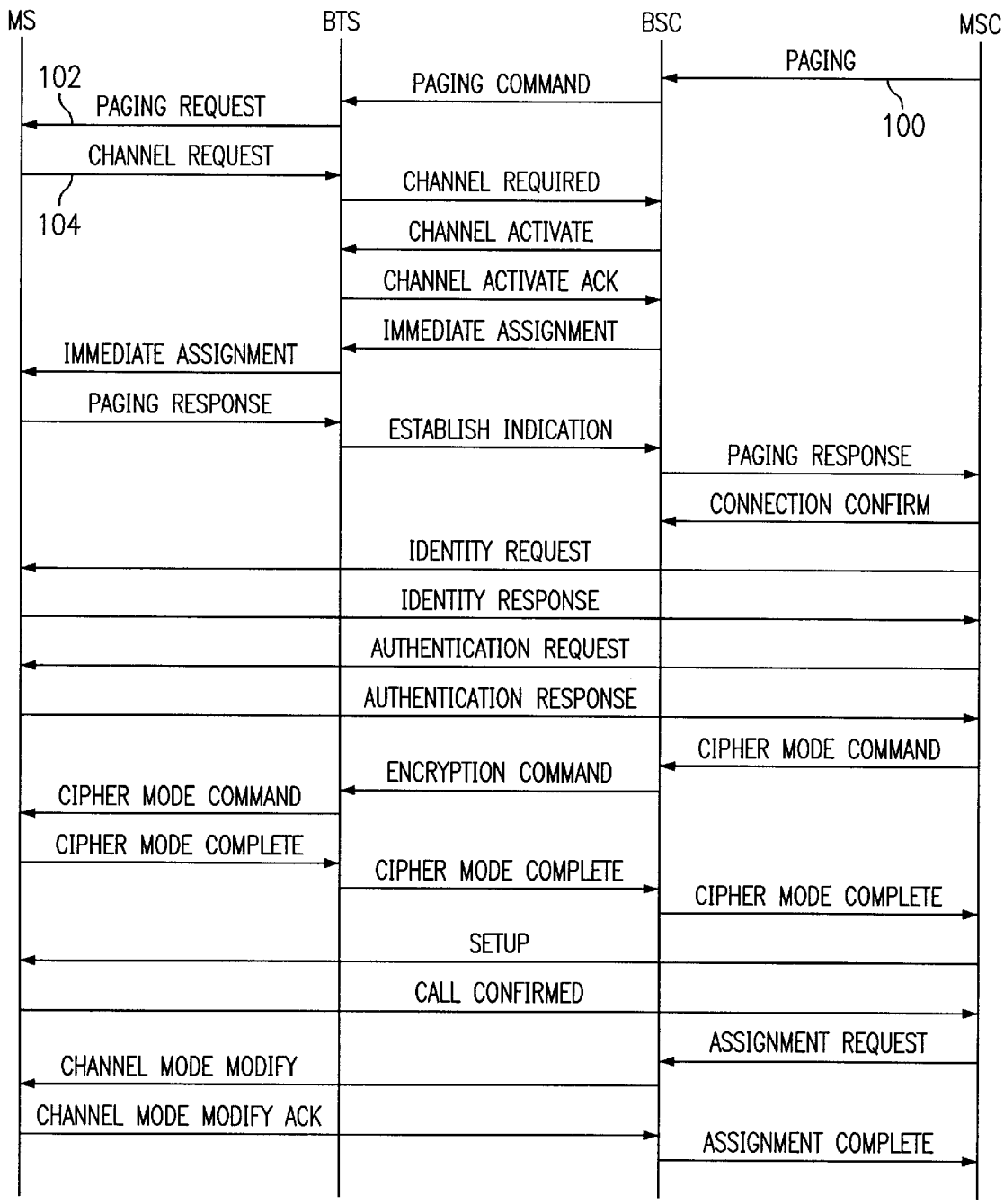
FIG. 5 is a message flow diagram of a mobile terminating call in accordance with the present invention.

The message diagram of FIG. 5 shows the manner in which a MS such as 36 receives a call in accordance with the present invention. A paging message 100 is sent from MSC 12 to BSC 18 and included therein is information as to the priority of the communication. The paging request message 102 is eventually received by MS 36 and it requests a channel as shown by message 104 in a manner similar to what would occur if it were initiating a call instead of receiving a call. The BSC 18 instructs the BTS to assign a channel as previously indicated by the paging message from the MSC. All the remaining messages follow the format of the GSM standard for the VEA option of FIG. 3.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A method of assigning one of two different speed signaling channel types, f1 and f2, in response to signaling channel requests made prior to a communication and associated data pertaining to communication priority in a cellular communication network having a plurality of possible channels of each of types f1 and f2, the method comprising the steps, performed during call setup, of:

initially assigning a signaling channel type f1 in response to a channel request by a mobile station;

reading a service request message to make a determination of the service type requested;

changing during call setup to signaling channel type f2 in response to a determination that the service type requested is a signaling channel type f2; and completing call setup using the signaling channel type requested in the service request message.

2. The method of claim 1 wherein the speed of the signaling channel type f1 is lower than the speed of the signaling channel type f2.

3. The method of claim 1 wherein the speed of the signaling channel type f2 is lower than the speed of the signaling channel type f1.

4. The method of claim 1 wherein:

the step of reading the service request message is accomplished by a base station controller of the network; and the type f1 signaling channel is released for use by the network after a change in signaling channel type to type f2.

5. The method of claim 1 further comprising the additional step of transmitting the required channel type data to a base station controller serving the called mobile station prior to completing a mobile station terminating call, where the paging request message includes the required channel type data for optimizing the setup time required to communicate with the second mobile station.

6. The method of claim 1 wherein the two signaling channel types are the SDCCH (slow dedicated control channel) channel and the TCH/F (full speed traffic) channel.

7. A cellular system communication apparatus having two different speed signaling channel types, f1 and f2, the apparatus comprising, in combination:

a plurality of base transceiver stations operably interconnected to at least one mobile switching center;

first means for receiving channel requests from mobile stations wishing to communicate with another communication unit;

second means for supplying a default signaling channel assignment of type f1 in response to the channel requests from a mobile station by said first means;

third means for receiving a service request from a mobile station after the mobile station receives the default signaling channel assignment of type f1 from said second means;

fourth means for detecting the type of communication to be established with the mobile station from the contents of the received service request; and fifth means for changing the signaling channel type assignment to f2 if the default signaling channel type does not match the service type requested in the service request before completing the remaining steps of call setup.

8. The apparatus as claimed in claim 7 wherein f1 is a lower speed communication channel than f2.

9. The apparatus as claimed in claim 7 wherein f2 is a lower speed communication channel than f1.

10. The apparatus as claimed in claim 7 wherein said cellular system is a GSM (Global System for Mobile communications) type system and the apparatus further comprises sixth means for transmitting channel type assignment data to a base station controller prior to completing a mobile station terminating call for optimizing the setup time required to establish communications with the called mobile station.

11. The apparatus as claimed in claim 7 wherein:
   each of said first, second, third and fifth means constitutes a part of each of said base transceiver stations; and
   said fourth means constitutes a part of a base station controller.

12. An early channel type assignment method for a cellular communication system comprising the steps of:
   initially assigning one of two different speed signaling channels f1 and f2, upon receipt of a channel request from a mobile station, by a base station controller wherein the channel initially assigned is to be used to complete call setup and for communications after completion of call setup; and
   immediately reassigning the mobile station to the other of said two different speed signaling channels f1 and f2 for completing call setup upon receipt of a CM service request message when, upon examination of the CM service request message by the base station controller, it is determined that the speed of the channel initially assigned does not match the speed of the channel requested in the CM service request message.

13. A cellular system communication apparatus, including at least base station controller and mobile switching center apparatus, having two different speed signaling channel types, f1 and f2, the apparatus comprising, in combination:

means for initially assigning one of two different speed signaling channels f1 and f2, upon receipt of a channel request from a mobile station; and means for reassigning the mobile station to the other of said two different speed signaling channels f1 and f2 before completing call setup when, from examination of a CM service request message, it is determined that speed of the channel requested in the CM service request message does not match the speed of the channel initially assigned.

14. The apparatus as claimed in claim 13 wherein said cellular system is a GSM (Global System for Mobile communications) type system, the two different speed signaling channel types comprise the SDCCH (slow dedicated control channel) and the TCH/F (full speed traffic) channels and the apparatus further comprises means for transmitting channel type assignment data through a paging request message to a base station controller portion of the system prior to completing a mobile station terminating call for optimizing the setup time required to establish communications with the second mobile station.

15. A cellular system apparatus for assigning during call setup one of two different speed signaling channel types, f1 and f2, in response to signaling channel requests made prior to a communication and associated data pertaining to communication priority in a cellular communication network having a plurality of possible channels of each of types f1 and f2, the apparatus comprising in combination:

means for initially assigning a signaling channel type f1 in response to a channel request by a mobile station;

means for reading a service request message to make a determination of the service type requested;

means for changing during call setup to signaling channel type f2 in response to a determination that the service type requested is a signaling channel type f2; and means for completing call setup using the signaling channel type requested in the service request message.

* * * * *